(12) United States Patent
Miyamoto et al.

(10) Patent No.: US 8,158,730 B2
(45) Date of Patent: Apr. 17, 2012

(54) POLYAMIDE RESIN

(75) Inventors: Masaaki Miyamoto, Kitakyushu (JP); Tatsuya Hitomi, Kitakyushu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 279 days.

(21) Appl. No.: 12/298,150

(22) PCT Filed: May 10, 2007

(86) PCT No.: PCT/JP2007/059670
§ 371 (c)(1),
(2), (4) Date: Oct. 23, 2008

(87) PCT Pub. No.: WO2007/132733
PCT Pub. Date: Nov. 22, 2007

(65) Prior Publication Data
US 2009/0099318 A1 Apr. 16, 2009

(30) Foreign Application Priority Data
May 16, 2006 (JP) ................................. 2006-136636

(51) Int. Cl.
*C08G 69/26* (2006.01)

(52) U.S. Cl. ........ 525/419; 524/607; 525/418; 525/420; 528/310; 528/338

(58) Field of Classification Search .................. 525/418, 525/419, 420; 524/607; 528/310, 338, 329.1
See application file for complete search history.

(56) References Cited

U.S. PATENT DOCUMENTS

| | | | |
|---|---|---|---|
| 2,130,948 A | 9/1938 | Carothers | |
| 5,039,786 A * | 8/1991 | Pipper et al. | 528/324 |
| 6,297,345 B1 | 10/2001 | Okushita et al. | |
| 6,703,475 B1 | 3/2004 | Deininger et al. | |
| 2007/0249783 A1 * | 10/2007 | Miyamoto et al. | 524/607 |

FOREIGN PATENT DOCUMENTS

| | | |
|---|---|---|
| CN | 1402751 A | 3/2003 |
| JP | 2000 336167 | 12/2000 |
| JP | 2003 292612 | 10/2003 |
| JP | 2005-6650 | 1/2005 |
| JP | 2006 348057 | 12/2006 |
| WO | WO 2005/113643 | * 12/2005 |

OTHER PUBLICATIONS

Office Action issued Aug. 17, 2010, in Chinese Patent Application No. 200780017406.9, filed May 16, 2006.
Office Action issued May 4, 2011, in Chinese Patent Application No. 200780017406.9 with English language translation.

* cited by examiner

*Primary Examiner* — Gregory Listvoyb
(74) *Attorney, Agent, or Firm* — Oblon, Spivak, McClelland, Maier & Neustadt, L.L.P.

(57) ABSTRACT

To provide a polyamide resin excellent in lasting thermal stability and having a high biomass ratio.
A polyamide resin comprising adipic acid units, pentamethylenediamine units and 6-aminocaproic acid units as constituents, wherein the weight ratio of the sum of the adipic acid units and the pentamethylenediamine units to the 6-aminocaproic acid units is 97:3 to 75:25. The pentamethylenediamine is preferably one produced from lysine using lysine decarboxylase, lysine decarboxylase-producing cells or a treated product of the cells.

13 Claims, No Drawings

POLYAMIDE RESIN

TECHNICAL FIELD

The present invention relates to a polyamide resin. Particularly, it relates to a polyamide resin excellent in lasting thermal stability, comprising adipic acid units, pentamethylenediamine units and 6-aminocaproic acid units as constituents, obtainable by using a material which suppresses generation of carbon dioxide ($CO_2$) which causes global warming.

BACKGROUND ART

Heretofore, naphtha, so-called fossil material has been used as a material of a polyamide resin. However, to prevent global warming by controlling emission of carbon dioxide and to promote a recycling society, it has been expected to replace a material for polyamide resin production with a biomass-derived material.

As a polyamide resin produced by using a biomass-derived material, 56 nylon has been known. As a method for producing 56 nylon, a method of heat polycondensing diaminopentane and adipic acid (e.g. Patent Document 1), a method of preparing a salt of diaminopentane and adipic acid and heat polycondensing it (e.g. Patent Document 2), etc. have been proposed.

56 nylon thus produced has heat resistance and mechanical properties substantially equal to those of 6 nylon and 66 nylon but is inferior in lasting thermal stability. A resin which is poor in lasting thermal stability is unstable for a large molded product which requires a long forming cycle, such as a resin intake manifold which is an automobile component. Further, it is also unstable for an extruded product such as a film or a filament, since granular defects called fisheyes are likely to generate.

Patent Document 3 proposes to improve lasting thermal stability by blending 56 nylon and 66 nylon. However, the biomass ratio of the material in the polyamide resin (the proportion of the biomass-derived material in materials used for the polyamide resin) decreases in an amount corresponding to the amount of 66 nylon.

Under these circumstances, a polyamide resin having high lasting thermal stability and a high biomass ratio has been desired.

Patent Document 1: JP-A-2003-292612
Patent Document 2: U.S. Pat. No. 2,130,948
Patent Document 3: JP-A-2006-348057

DISCLOSURE OF THE INVENTION

Object to be Accomplished by the Invention

Under these circumstances, the object of the present invention is to provide a polyamide resin excellent in lasting thermal stability and having a high biomass ratio.

Means to Accomplish the Object

The present inventors have conducted extensive studies to achieve the above object and as a result, they have found that the above object can be accomplished by a polyamide resin comprising adipic acid units, pentamethylenediamine units and 6-aminocaproic acid units as constituents, wherein the ratio of the sum of the adipic acid units and the pentamethylenediamine units to the 6-aminocaproic acid units is within a specific range, and accomplished the present invention.

Namely, the present invention provides the following.

1. A polyamide resin comprising adipic acid units, pentamethylenediamine units and 6-aminocaproic acid units as constituents, wherein the weight ratio of the sum of the adipic acid units and the pentamethylenediamine units to the 6-aminocaproic acid units is 97:3 to 75:25.
2. The polyamide resin, wherein the weight ratio of the sum of the adipic acid units and the pentamethylenediamine units to the 6-aminocaproic acid units is 95:5 to 80:20.
3. The polyamide resin, wherein the total contents of the adipic acid units, the pentamethylenediamine units and the 6-aminocaproic acid units is at least 90 wt % of the whole constituents.
4. The polyamide resin, wherein the pentamethylenediamine is produced from lysine using lysine decarboxylase, lysine decarboxylase-producing cells or a treated product of the cells.
5. The polyamide resin, wherein the biomass ratio is at least 30.8 wt %.
6. The polyamide resin, which has such a degree of polymerization that the relative viscosity of a 98 wt % sulfuric acid solution of the polyamide resin (polyamide resin concentration: 0.01 g/ml) at 25° C. is from 1.5 to 8.0.
7. A polyamide film comprising the polyamide resin is as defined in any one of the above 1 to 6.
8. A polyamide filament comprising the polyamide resin as defined in any one of the above 1 to 6.

Effects of the Invention

The polyamide resin of the present invention is excellent in lasting thermal stability and is thereby particularly effective to suppress deterioration of a large injection molded product and to suppress fisheyes on an extruded product. Further, since it has a high biomass ratio, a remarkable effect of reducing environmental load can be expected more than ever in various industrial fields. Thus, the present invention is very highly industrially valuable.

BEST MODE FOR CARRYING OUT THE INVENTION

Now, the present invention will be described in detail below. However, the following description regarding the constituents are merely typical examples of the embodiment of the present invention, and the present invention is by no means restricted thereto.

(Polyamide Resin)

The polyamide resin of the present invention comprises adipic acid units, pentamethylenediamine units and 6-aminocaproic acid units as constituents, wherein the weight ratio of the sum of the adipic acid units and the pentamethylenediamine units to the 6-aminocaproic acid units (the sum of the adipic acid units and the pentamethylenediamine units/the 6-aminocaproic acid units) is 97:3 to 75:25, preferably 95:5 to 80:20, more preferably 90:10 to 82:18. Namely, in other words, it is a polyamide resin wherein the proportion of the total amount of the adipic acid units and the pentamethylenediamine units to the total amount of the adipic acid units, the pentamethylenediamine units and the 6-aminocaproic acid units constituting the polyamide resin is at most 97 wt % and at least 75 wt %, preferably at most 95 wt % and at least 80 wt %, more preferably at most 90 wt % and at least 82 wt %. If this proportion exceeds 97 wt %, the lasting thermal stability, pinhole resistance and extensibility of a film to be obtained, flexibility and extensibility of a filament to be obtained will decrease, and if it is less than 75 wt %, heat resistance will decrease due to a decrease in melting point, or the strength of a film or the strength of a filament will decrease.

Further, in the polyamide resin of the present invention, the total content of the adipic acid units, the pentamethylenediamine units and the 6-aminocaproic acid units is at least 90 wt %, particularly preferably at least 95 wt % of the whole constituents. If the total content is less than 90 wt %, it is difficult to satisfy both lasting thermal stability and a high biomass ratio.

Accordingly, the polyamide resin of the present invention may contain a copolymerizable component other than the adipic acid units, the pentamethylenediamine units and the 6-aminocaproic acid units as the essential constituents in an amount less than 10 wt %, preferably less than 5 wt % of the constituents and within a range not to impair the effects of the present invention. In such a case, the copolymerizable component may, for example, be an amino acid such as 11-aminoundecanoic acid, 12-aminododecanoic acid or p-aminomethylbenzoic acid; a lactam other than ε-caprolactam, such as ω-laurolactam; an aliphatic dicarboxylic acid such as oxalic acid, malonic acid, succinic acid, glutaric acid, pimelic acid, suberic acid, acelaic acid, sebacic acid, undecanedioic acid, dodecanedioic acid, brasylic acid, tetradecanedioic acid, pentadecanedioic acid or octadecanedioic acid; an alicyclic dicarboxylic acid such as cyclohexane dicarboxylic acid; an aromatic dicarboxylic acid such as phthalic acid, isophthalic acid, terephthalic acid or naphthalene dicarboxylic acid; an aliphatic diamine such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane or 2-methyl-1,5-diaminopentane; an alicyclic diamine such as cyclohexanediamine or bis-(4-aminohexyl)methane; or an aromatic diamine such as xylylene diamine.

Such copolymerizable components may be used alone or as a mixture of two or more of them.

The polyamide resin of the present invention may be a blend of homopolyamides or a copolymer so long as it comprises the above constituents. Namely, it may be a blend of a polyamide 56 homopolymer and a polyamide 6 homopolymer, or may be a copolymerized polyamide comprising pentamethylenediamine, adipic acid and 6-aminocaproic acid as constituents. Particularly, it is preferably a copolymer polyamide comprising pentamethylenediamine, adipic acid and 6-aminocaproic acid as constituents, to achieve the effects of the present invention.

As a process for producing a homopolyamide and a polyamide copolymer among the polyamide resins of the present invention, a known process may be used, specifically, as disclosed in e.g. "Polyamide Resin Handbook" (edited by Osamu Fukumoto, published by THE NIKKANKOGYO SHIMBUN LTD., 1988). As a process for producing a polyamide 56/6 copolymer, preferred is a process of polycondensing adipic acid, pentamethylenediamine and ε-caprolactam. Specifically, preferred is a process (heat polycondensation) of mixing a salt of pentamethylenediamine and adipic acid with ε-caprolactam in the presence of water, and heating the mixture to conduct dehydration reaction. In such a case, the copolymer compositional ratio in the polyamide resin to be obtained can be changed by changing the mixture ratio of the salt of pentamethylenediamine and adipic acid to ε-caprolactam.

In the present invention, the above heat polycondensation is carried out preferably by increasing the maximum ultimate temperature of the mixture to be polymerized during preparation of the polyamide resin to 200° C. or above. The upper limit of the maximum ultimate temperature is usually at most 300° C. considering heat stability of the polyamide resin during polymerization. The maximum ultimate temperature of the mixture to be polymerized during preparation of the polyamide resin is more preferably from 240 to 290° C.

The polymerization may be conducted either by batch process or by continuous process.

The polyamide resin produced by the above process may further be subjected to solid phase polymerization after the heat polycondensation, whereby the molecular weight of the polyamide resin can be increased. The solid phase polymerization may be carried out, for example, by heating the polyamide resin at a temperature of at least 100° C. and at most the melting point of the resin in vacuum or in an inert gas.

As the pentamethylenediamine as a material component for the polyamide resin of the present invention, preferred is one produced from lysine using lysine decarboxylase, lysine decarboxylase-producing cells or a treated product of the cells, whereby the biomass ratio (the proportion of a biomass-derived material in materials used for the polyamide resin) can be increased. The biomass ratio in the present invention is a proportion of the biomass-derived material in materials for the polyamide resin and is represented by the following formula:

Biomass ratio (%)=(the weight of the biomass-derived material)/(the weight of the entire materials)×100

Of the polyamide resin of the present invention, the biomass ratio is preferably at least 30.8 wt %, more preferably at least 32.9 wt %, by use of the pentamethylenediamine thus produced from lysine. The higher the biomass ratio, the greater the effect of suppressing generation of carbon dioxide which causes global warming, such being favorable.

Production of pentamethylenediamine from lysine may be carried out by enzymatic decarboxylation reaction of lysine by adding an acid to a lysine solution so that the pH of the solution is maintained to a pH suitable for the enzymatic decarboxylation reaction. The acid used may be an inorganic acid such as hydrochloric acid, sulfuric acid or phosphoric acid or an organic acid such as acetic acid. After the reaction, free pentamethylenediamine can be collected from the obtained reaction product liquid by a common separation and purification method. Further, by use of a dicarboxylic acid such as adipic acid as the above acid, pentamethylenediamine dicarboxylate to be a material for polyamide production may be directly collected. As a process of producing pentamethylenediamine adipate by enzymatic decarboxylate reaction of lysine by using adipic acid as an acid is disclosed in JP-A-2005-6650.

The degree of polymerization of the polyamide resin of the present invention is such that the relative viscosity of a 98 wt % sulfuric acid solution of the polyamide resin (polyamide resin concentration: 0.01 g/ml) at 25° C. is preferably from 1.5 to 8.0, more preferably from 1.8 to 5.0. If the relative viscosity is less than 1.5, practical strength may be insufficient, and if it exceeds 8.0, the flowability will decrease, thus impairing moldability in some cases.

The melting point of the polyamide resin of the present invention is usually from 210 to 255° C., preferably from 220 to 250° C.

The method of measuring the relative viscosity of the polyamide resin is as disclosed in after-mentioned Examples.

To the polyamide resin of the present invention, another component may be blended within a range not to impair the effects of the present invention at an optional stage from production (polycondensation) to molding of the polyamide resin. Such another component to be blended may, for example, be an antioxidant and/or a thermal stabilizer, a weather resisting agent, a crystal nucleus agent, an inorganic filler, a mold release agent and/or a lubricant, a pigment, a dye, a plasticizer, an antistatic agent, a flame retardant or another polymer.

The antioxidant and/or the thermal stabilizer may, for example, be a hindered phenol type, hydroquinone type or phosphite type compound or a substituted product thereof, a copper halide or an iodine compound.

The weather resisting agent may, for example, be a resorcinol type, salicylate type, benzotriazole type, benzophenone type or hindered amine type compound.

The crystal nucleus agent may, for example, be fine inorganic particles of talc, kaolin, silica, boron nitride or the like, or a metal oxide or high melting nylon.

The inorganic filler may, for example, be graphite, barium sulfate, magnesium sulfate, calcium carbonate, magnesium carbonate, antimony oxide, titanium oxide, aluminum oxide, zinc oxide, iron oxide, zinc sulfide, zinc, lead, nickel, aluminum, copper, iron, stainless steel, glass fibers, glass flakes, glass beads, carbon fibers, talc, silica, kaoline, clay, wollastonite, mica, boron nitride, potassium titanate, aluminum borate, bentonite, montmorillonite or synthetic mica, and among them, preferred are glass fibers which have a high reinforcing effect and which are available at a relatively low cost.

As the glass fibers, glass fibers usually used for a thermoplastic resin may be used, and among them, preferred are chopped strands produced from E glass (alkali free glass), and their fiber diameter is usually from 1 to 20 μm, preferably from 5 to 15 μm. The glass fibers are preferably surface-treated with a silane coupling agent or the like to improve adhesion to the polyamide resin.

The mold release agent and/or the lubricant may, for example, be an aliphatic alcohol, an aliphatic amide, an aliphatic bisamide, a bisurea or polyethylene wax.

The pigment may, for example, be cadmium sulfide, phthalocyanine or carbon black.

The dye may, for example, be nigrosine or aniline black. The plasticizer may, for example, be octyl p-oxybenzoate or N-butylbenzenesulfonamide.

The antistatic agent may, for example, be an alkyl sulfate type anionic antistatic agent, a quaternary ammonium salt type cationic antistatic agent, a nonionic antistatic agent such as polyoxyethylene sorbitan monostearate, or a betaine type amphoteric antistatic agent.

The flame retardant may, for example, be a hydroxide such as melamine cyanurate, magnesium hydroxide or aluminum hydroxide, ammonium polyphosphate, brominated polystyrene, brominated polyphenylene oxide, brominated polycarbonate or brominated epoxy resin or a combination of such a brominated flame retardant and antiomy trioxide.

Another polymer may, for example, be another polyamide, a polyethylene, a polypropylene, a polyester, a polycarbonate, a polyphenylene ether, a polyphenylene sulfide, a liquid crystal polymer, a polysulfone, a polyether sulfone, an ABS resin, a SAN resin or a polystyrene.

They may be used alone or as a mixture of two or more of them.

The polyamide resin of the present invention may be molded into a desired shape by an optional forming method such as injection molding, film forming, melt spinning, blow molding or vacuum forming. For example, it may be formed into an injection molded product, a film, a sheet, a filament, a tapered filament or fibers. Further, the polyamide resin of the present invention may be used for an adhesive, a coating agent, etc.

Specific examples of the application of the polyamide resin of the present invention includes, as automobile/vehicle-related components, automobile underhood components such as an intake manifold, a hinged clip (hinged molded product), a banding band, a resonator, an air cleaner, an engine cover, a rocker cover, a cylinder head cover, a timing belt cover, a gas tank, a fuel subtank, a radiator tank, an intercooler tank, an oil reservoir tank, an oil pan, an electric power steering gear, an oil strainer, a canister, an engine mount, a junction block, a relay block, a connector, a corrugated tube and a protector, exterior components for automobiles such as a door handle, a fender, a hood bulge, a roof rail leg, a door mirror stay, a bumper, a spoiler and a wheel cover, and interior components for automobiles such as a cup holder, a console box, an accelerator pedal, a clutch pedal, a shift lever base and a gear lever knob.

Further, the polyamide resin of the present invention is useful for various applications such as electrical and electronic components, components for household/office electric products, computer-related components, facsimile/copying machine-related components and machine-related components, represented by fishery-related supplies including a fishing line, a fish net and the like, a switch, a micro slide switch, a DIP switch, a housing of a switch, a lamp socket, a banding band, a connector, a housing of a connector, a shell of a connector, an IC socket, a coil bobbin, a bobbin cover, a relay, a relay box, a condenser case, inner parts of a is motor, a small motor case, a gear cam, a dancing pulley, a spacer, an insulator, a caster, a terminal strip, a housing of an electric tool, an insulating portion of a starter, a fuse box, a housing of a terminal, a bearing retainer, a speaker diaphragm, a heat resistant container, a microwave oven component, a rice cooker component, a printer ribbon guide, etc.

(Film)

When the polyamide resin of the present invention is formed into a film, as the case requires, an additive such as an inorganic filler to improve slipping properties, an antiblocking agent, a crystal nucleus agent, an antioxidant and/or a heat stabilizer, a weather resisting agent, a mold release agent and/or a lubricant, a pigment, a dye, a plasticizer, an antistatic agent or a flame retardant is added, followed by mixing, and a film is formed in accordance with a conventional method such as a T-die method, a water cooling inflation method or an air cooling inflation method.

As the inorganic filler, it is possible to use talc, graphite, barium sulfate, magnesium sulfate, calcium carbonate, calcium silicate, magnesium carbonate, antimony oxide, titanium oxide, aluminum oxide, zinc oxide, iron oxide, zinc sulfide, zinc, lead, nickel, aluminum, copper, iron, stainless steel, glass fibers, glass flakes, glass beads, carbon fibers, silica, kaoline, calcined kaoline, clay, zeolite, wollastonite, mica, boron nitride, potassium titanate, aluminum borate, bentonite, montmorillonite, synthetic mica, etc., and among them, talc, kaoline, calcined kaoline, silica or zeolite is preferred. They may be used alone or as a mixture of two or more of them.

The amount of addition of the inorganic filler is preferably from 0.005 to 0.1 part by weight per 100 parts by weight of the polyamide resin, since transparency will be impaired if it is excessively large and the slipping properties will not improve if it is too small.

The inorganic filler is particularly preferably a particulate inorganic filler. More preferred is a combination of an inorganic filler and a mold release agent and/or a lubricant. In such a case, the mold release agent and/or the lubricant is used preferably in an amount of from 0.01 to 0.5 part by weight per 100 parts by weight of the polyamide resin.

The thickness of the film of the polyamide resin thus obtained is properly determined depending upon the purpose of use, and is usually from about 1 to about 70 μm.

(Filament)

When the polyamide resin of the present invention is spun into a filament, spinning is carried out in accordance with a known method by e.g. a spinning extruder.

The molding temperature at the time of spinning a filament (monofilament) is usually a temperature of at least the melting point of the polyamide resin, preferably a temperature higher by at least 10° C. than the melting point of the polyamide resin.

The degree of fineness of the filament thus obtained is not particularly limited, and a wide range of from 50 to 30,000 Tex is employed.

EXAMPLES

Now, the present invention will be explained in further detail with reference to Examples. However, the present invention is by no means restricted to such specific Examples unless they exceed the scope of the present invention.

Methods for analyzing constituents of the polyamide resin are as follows.

(Analysis of Adipic Acid Units and 6-aminocaproic Acid Units in the Polyamide Resin)

A sample was hydrolyzed with 6 N hydrochloric acid. 1 N sodium hydroxide was dropped to the hydrolyzate solution for neutralization to prepare a hydrolyzate stock solution. To the hydrolyzate stock solution, a HPLC mobile phase (0.01 M octanesulfonic acid/acetonitrile=85/15) was added to prepare an analysis sample solution. This analysis sample solution was analyzed by liquid chromatography under the following conditions. After the analysis, the contents of constituents were determined using a preliminarily prepared analytical curve.

Apparatus: Agilent HP-1100

Column: CAPCELL PAK C18 MG S-3 4.6 mml. D.×75 mm

Column temperature: 40° C. Mobile phase: 0.01 M octanesulfonic acid/acetonitrile=85/15

Flow rate: 1 ml/min

Detector: PDA (UV 205 nm)

Injection amount: 5 μl (Analysis of Pentamethylenediamine Units and Hexamethylenediamine Units in the Polyamide Resin)

A sample was hydrolyzed with 6 N hydrochloric acid. The hydrolyzate solution was evaporated to dryness by a rotary evaporator and vacuum dried at 40° C. for one hour, and trifluoroacetic anhydride was added for acylation. The surplus trifluoroacetic anhydride was distilled off by a rotary evaporator, and the residue was dissolved in acetonitrile to prepare an analysis sample solution. This analysis sample solution was analyzed by gas chromatography under the following conditions. After the analysis, the contents of constituents were determined using a preliminarily prepared analytical curve.

Column: SPB-1 SULFUR, 30 m×0.32 mml. D., 4.00 μm film thickness

Carrier: He 2.0 ml/min (Constant Flow Mode)

Column temperature: 80° C. (0 min) to 10° C./min to 280° C. (30 min)

Inlet: temperature 230° C., Split Ratio 20:1

Injection amount: 1 μl

Further, methods for evaluating physical properties and characteristics of the polyamide resin are as follows.

(1) Relative Viscosity (ηr)

A 98 wt % sulfuric acid solution of the polyamide resin (concentration: 0.01 g/ml) was prepared, and the relative viscosity was measured using an Ostwald viscometer at 25° C.

(2) Melting Point (m.p.)

DSC (differential scanning calorimetry) was carried out using "Robot DSC" manufactured by Seiko Instruments & Electronics Ltd. First, about 5 mg of a polyamide resin was put in a sample pan, heated to 290° C. in a nitrogen atmosphere and held for 3 minutes so that it was completely melted, and cooled to 30° C. at a cooling rate of 20° C./min. The temperature at the exothermic peak observed is regarded as the cooling crystallization temperature (Tc). Then, the polyamide resin was held at 30° C. for 3 minutes and heated from 30° C. to 290° C. at a heating rate of 20° C./min. The endothermic peak observed during the heating was measured and the temperature of the observed endothermic peak was regarded as the melting point (Tm). In a case where a plurality of endothermic peaks were detected, the highest temperature was regarded as the melting point.

(3) Lasting Thermal Stability 7 g of a polyamide resin was put in a test tube with a capacity of 18 ml, and the test tube was dipped in an oil bath at a temperature of the melting point +30° C. in a hermetically-sealed environment in a nitrogen atmosphere, and the sample was recovered 9 hours later to measure the relative viscosity. The viscosity retention ratio was calculated from the relative viscosities before and after the test. A high viscosity retention ratio indicates excellent lasting thermal stability.

Further, methods for evaluating a film and a monofilament made of the polyamide resin are as follows.

(Pinhole Resistance of the Film)

The pinhole resistance was evaluated by the number of pinholes after a repeated flex fatigue test.

In a repeated flex fatigue test (gelbo flex test), using gelbo flex tester manufactured by Rigaku Corporation, repeated flex fatigue was applied to the film 1,000 times in predetermined environmental conditions in accordance with MIL-B-131C at 23° C. at 65% RH or at 0° C., and then the number of pinholes on the film was counted.

The number of pinholes was counted by poroscope DCH8E manufactured by HELMUT FISCHER GMBH (Germany), which is an apparatus to count the number of pinholes in such a manner that a sample film is put on a ground metal is plate, and the surface of the film is scanned with a brush to which a voltage of 1.2 kV was charged, and a current flows if there is a pinhole, whereby the number of pinholes can be counted.

(Degree of Fineness, Young's Modulus, Linear Strength and Knot Strength of the Monofilament)

In accordance with JIS L1013, the degree of fineness, the Young's modulus, the linear strength and the knot strength of the monofilament were measured.

In the following Examples and Comparative Examples, an equimolar salt of pentamethylenediamine and adipic acid was prepared in accordance with the method disclosed in Examples 1 to 3 in JP-A-2005-6650. ε-Caprolactam was a product manufactured by Mitsubishi Chemical Corporation.

Further, an equimolar salt of hexamethylenediamine and adipic acid was a product manufactured by Rhodia.

Example 1

25 kg of water was added to 25 kg of a mixture (the weight ratio was as identified in Table 1) of ε-caprolactam and an equimolar salt of pentamethylenediamine and adipic acid, and 1.25 g of phosphorous acid was added, and the mixture was completely dissolved in a nitrogen atmosphere to obtain an aqueous material solution. The above aqueous material solution was transferred to an autoclave preliminarily replaced with nitrogen by a plunger pump. The jacket temperature and the pressure in the autoclave were adjusted to 280° C. and 1.47 MPa, respectively, and the content was heated at 270° C. Then, the pressure in the autoclave was gradually discharged and was further reduced, and a point when a predetermined stirring power was achieved was regarded as completion of the reaction. After completion of the reaction, the pressure was recovered by nitrogen, the content was introduced to a cooling water bath in a strand and then pelletized by a rotary cutter. The obtained pellets were dried at 120° C. under 1 torr (0.13 kPa) until the water content became 0.1 wt % or less to obtain a polyamide resin.

The obtained polyamide resin was evaluated, and the results are shown in Table 1.

Example 2

A polyamide resin was obtained in the same manner as in Example 1 except that the composition of monomers charged for the aqueous material solution was changed as identified in Table 1.

The obtained polyamide resin was evaluated, and the results are shown in Table 1.

Comparative Example 1

A polyamide resin was obtained in the same manner as in Example 1 except that the composition of monomers charged for the aqueous material solution was changed as identified in Table 1 (an equimolar salt of hexamethylenediamine and adipic acid was used instead of ε-caprolactam).

The obtained polyamide resin was evaluated, and the results are shown in Table 1.

In Table 1, the biomass ratios of the polyamide resins obtained in the respective Examples are also shown.

It is understood from Table 1 that the polyamide resin of the present invention has a high biomass ratio and is excellent in lasting thermal stability.

Example 3

25 kg of water was added to 25 kg of a mixture (the weight ratio was as identified in Table 2) of ε-caprolactam and an equimolar salt of pentamethylenediamine and adipic acid, and 1.25 g of phosphorous acid was added, and the mixture was completely dissolved in a nitrogen atmosphere to obtain an aqueous material solution. The above aqueous material solution was transferred to an autoclave preliminarily replaced with nitrogen by a plunger pump. The jacket temperature and the pressure in the autoclave were adjusted to 280° C. and 1.47 MPa, respectively, and the content was heated to 270° C. Then, the pressure in the autoclave was gradually discharged and further reduced, and a point when a predetermined stirring power was achieved was regarded as completion of the reaction. After completion of the reaction, the pressure was recovered by nitrogen, and the content was introduced to a cooling water bath in a strand and pelletized by a rotary cutter. Using boiling water in an amount 1.5 times the amount of the obtained pellets, unreacted monomers and oligomers were removed by extraction. The pellets from which unreacted products were removed were dried at 120° C. under 1 torr (0.13 kPa) until the moisture content became 0.1% or below to obtain a polyamide resin.

With 100 parts by weight of the obtained polyamide resin, 0.03 part by weight of talc having an average particle size of 3.0 μm and 0.1 part by weight of ethylenebisstearic acid amide (KAO WAX EB-FF, manufactured by KAO Corporation) were dry-blended to obtain a polyamide resin composition, which was formed into a film with a thickness of 25 μm using a T-die type film forming machine with an extruder cylinder diameter of 40 mm at an extruder cylinder preset temperature of 260° C. and a cooling roller temperature of 90° C.

The obtained film was evaluated with respect to pinhole resistance. The results are shown in Table 2.

TABLE 1

| | | Unit | Ex. 1 | Ex. 2 | Comp. Ex. 1 |
|---|---|---|---|---|---|
| Charged monomer composition | Salt of pentamethylenediamine and adipic acid | wt % | 95 | 85 | 85 |
| | Salt of hexamethylenediamine and adipic acid | wt % | 0 | 0 | 15 |
| | ε-Caprolactam | wt % | 5 | 15 | 0 |
| Constituents of polyamide resin | Pentamethylenediamine (a) | wt % | 38.7 | 34.1 | 35.0 |
| | Adipic acid (b) | wt % | 55.5 | 48.8 | 58.4 |
| | Hexamethylenediamine | wt % | 0 | 0 | 6.6 |
| | 6-Aminocaproic acid (c) | wt % | 5.8 | 17.1 | 0 |
| | Weight ratio (a + b):(c) | — | 94.2:5.8 | 82.9:17.1 | 93.4:0 |
| Polyamide resin constitution | | — | 56/6 nylon | 56/6 nylon | 56/66 nylon |
| Results of evaluation of polyamide resin | Relative viscosity | — | 2.90 | 2.93 | 2.95 |
| | Melting point (Tm) | ° C. | 248 | 224 | 248 |
| | Lasting thermal stability — Test temperature | ° C. | 278 | 254 | 278 |
| | Lasting thermal stability — Relative viscosity after test | — | 2.53 | 2.90 | 2.52 |
| | Lasting thermal stability — Retention ratio of relative viscosity after test | % | 87.8 | 99.0 | 85.4 |
| Biomass ratio of polyamide resin | | % | 39.1 | 35.0 | 35.0 |

Further, using the obtained polyamide resin, spinning was conducted by a spinning extruder having a gear pump and a nozzle having 18 holes with a diameter of 0.6 mm attached to the tip of a single screw extruder. The cylinder temperature of the extruder and the gear pump preset temperature were 260° C., and for the spinning, the polyamide resin was made to pass through a cooling water bath of 20° C. to cool and solidify it, first stretching (98° C., in a steam atmosphere, stretch ratio of 3.5) was carried out, then second stretching (175° C., in a hot wind atmosphere, the stretch ratio was adjusted in accordance with the total stretch ratio) was carried out, and finally heat fixation (175° C., in a hot air atmosphere, relaxation ratio of 5%) was carried out.

The obtained monofilament was evaluated with respect to various physical properties. The results are shown in Table 2.

Comparative Example 2

25 kg of caprolactam manufactured by Mitsubishi Chemical Corporation, 0.75 kg of water and 1.74 g of disodium hydrogenphosphite pentahydrate were put in a container, followed by replacement with nitrogen, and the contents were dissolved at 100° C. The resulting aqueous material solution was transferred to an autoclave, and heating was started with the jacket temperature set at 280° C. The content was heated to 270° C., then the pressure in the autoclave was gradually discharged and further reduced, and when a predetermined stirring power was achieved, the polycondensation reaction was completed. After completion of the reaction, the pressure was recovered with nitrogen, and the content was introduced to a cooling water bath in a strand and pelletized by a rotary cutter. Using boiling water in an amount 1.5 times that of the obtained pellets, unreacted monomers and oligomers were removed by extraction. The pellets from which unreacted products were removed were dried at 120° C. under 1 torr (0.13 kPa) until the moisture content became 0.1% or below to obtain a polyamide resin.

Using the obtained polyamide resin, in the same manner as in Example 3, formation and evaluation of a film and spinning and evaluation of a monofilament were carried out. The results are shown in Table 2.

Comparative Example 3

A polyamide resin was obtained in the same manner as in Example 3 except that the composition of monomers charged for the aqueous material solution was changed as identified in Table 2 (an equimolar salt of hexamethylenediamine and adipic acid was used instead of the equimolar salt of pentamethylenediamine and adipic acid).

Using the obtained polyamide resin, in the same manner as in Example 3, formation and evaluation of a film and spinning and evaluation of a monofilament were carried out. The results are shown in Table 2.

In Table 2, the biomass ratios of the polyamide resins obtained in the respective Examples are also shown.

TABLE 2

| | | | Unit | Ex. 3 | Comp. Ex. 2 | Comp. Ex. 3 |
|---|---|---|---|---|---|---|
| Charged monomer composition | Salt of pentamethylenediamine and adipic acid | | wt % | 80 | 0 | 0 |
| | Salt of hexamethylenediamine and adipic acid | | wt % | 0 | 0 | 5 |
| | ε-Caprolactam | | wt % | 20 | 100 | 95 |
| Constituents of polyamide resin | Pentamethylenediamine (a) | | wt % | 31.9 | 0 | 0 |
| | Adipic acid (b) | | wt % | 45.6 | 0 | 2.4 |
| | Hexamethylenediamine | | wt % | 0 | 0 | 1.9 |
| | 6-Aminocaproic acid (c) | | wt % | 22.5 | 100 | 95.7 |
| | Weight ratio (a + b):(c) | | — | 77.5:22.5 | 0:100 | 2.4:95.7 |
| Polyamide resin constitution | | | — | 56/6 nylon | 6 nylon | 6/66 nylon |
| Relative viscosity of polyamide resin | | | — | 3.40 | 3.43 | 3.40 |
| Film physical properties | Number of pinholes | 23° C., 65% RH | Pinholes | 0 | 0 | 0 |
| | | 0° C. | Pinholes | 0 | 5 | 2 |
| Physical properties of monofilament | Stretch ratio (5.27) | Degree of fineness | Tex | 480 | 480 | 480 |
| | | Young's modulus | GPa | 1.8 | 2.7 | 2.4 |
| | | Linear strength | cN/dtex | 5.5 | 7.7 | 7.2 |
| | | Knot strength | cN/dtex | 4.0 | 5.4 | 5.8 |
| | Stretch ratio (4.10) | Degree of fineness | Tex | 480 | 480 | 480 |
| | | Young's modulus | GPa | 1.7 | 1.9 | 1.9 |
| | | Linear strength | cN/dtex | 5.2 | 5.2 | 5.0 |
| | | Knot strength | cN/dtex | 3.8 | 3.6 | 3.7 |
| Biomass ratio of polyamide resin | | | % | 32.9 | 0 | 0 |

It is understood from Table 2 that regarding the physical properties of the film, the number of pinholes in Example 3 is smaller than in Comparative Examples 2 and 3. Further, regarding the physical properties of the monofilament, the Young's modulus which is a measure of flexibility is lower in Example 3 than in Comparative Examples 2 and 3 either in a case of the stretch ratios of 5.27 and 4.10.

INDUSTRIAL APPLICABILITY

The polyamide resin of the present invention is excellent in lasting thermal stability and is thereby particularly effective to suppress deterioration of a large injection molded product and to suppress fisheyes on an extruded product. Further, since it has a high biomass ratio, a remarkable effect of reducing environmental load can be expected more than ever in various industrial fields, and thus the present invention is very highly industrially valuable.

The entire disclosure of Japanese Patent Application No. 2006-136636 filed on May 16, 2006 including specification, claims and summary is incorporated herein by reference in its entirety.

The invention claimed is:

1. A polyamide resin comprising adipic acid units, pentamethylenediamine units and 6-aminocaproic acid units, wherein the weight ratio of the sum of the adipic acid units and the pentamethylenediamine units to the 6-aminocaproic acid units is 85:15 to 75:25 wherein the total contents of the adipic acid units, the pentamethylenediamine units and the 6-aminocaproic acid units is at least 90 wt % of the polyamide resin.

2. The polyamide resin according to claim 1, wherein the weight ratio of the sum of the adipic acid units and the pentamethylenediamine units to the 6-aminocaproic acid units is 85:15 to 80:20.

3. The polyamide resin according to claim 1, wherein the pentamethylenediamine is produced from lysine using lysine decarboxylase, lysine decarboxylase-producing cells or a treated product of the lysine decarboxylase-producing cells.

4. The polyamide resin according to claim 1, wherein a biomass ratio is at least 30.8 wt %.

5. The polyamide resin according to claim 1, wherein the relative viscosity of a 98 wt % sulfuric acid solution of the polyamide resin (polyamide resin concentration: 0.01 g/ml) at 25° C. is from 1.5 to 8.0.

6. A polyamide film comprising the polyamide resin as defined in claim 1.

7. A polyamide filament comprising the polyamide resin as defined in claim 1.

8. The polyamide resin according to claim 1, wherein the weight ratio of the sum of the adipic acid units and the pentamethylenediamine units to the 6-aminocaproic acid units is 85:15 to 82:18.

9. The polyamide resin according to claim 1, wherein the total contents of the adipic acid units, the pentamethylenediamine units and the 6-aminocaproic acid units is at least 95 wt % of the polyamide resin.

10. The polyamide resin according to claim 1, wherein the relative viscosity of a 98 wt % sulfuric acid solution of the polyamide resin (polyamide resin concentration: 0.01 g/ml) at 25° C. is from 1.8 to 5.0.

11. The polyamide resin according to claim 1, wherein said polyamide has a melting point of from 210 to 255° C.

12. The polyamide resin according to claim 1, wherein said polyamide has a melting point of from 220 to 250° C.

13. The polyamide resin according to claim 1, further comprising 0.005 to 0.1 pbw of an inorganic filler per 100 pbw of said polyamide resin.

* * * * *